March 11, 1952 G. B. HILL 2,589,083
SLACK PULLER FOR BALE TIERS
Filed May 15, 1947 5 Sheets-Sheet 1

INVENTOR.
GEORGE B. HILL
BY
ATTORNEYS

March 11, 1952 G. B. HILL 2,589,083
SLACK PULLER FOR BALE TIERS
Filed May 15, 1947 5 Sheets-Sheet 2

INVENTOR.
GEORGE B. HILL
BY
ATTORNEYS

March 11, 1952 G. B. HILL 2,589,083
SLACK PULLER FOR BALE TIERS
Filed May 15, 1947 5 Sheets-Sheet 3
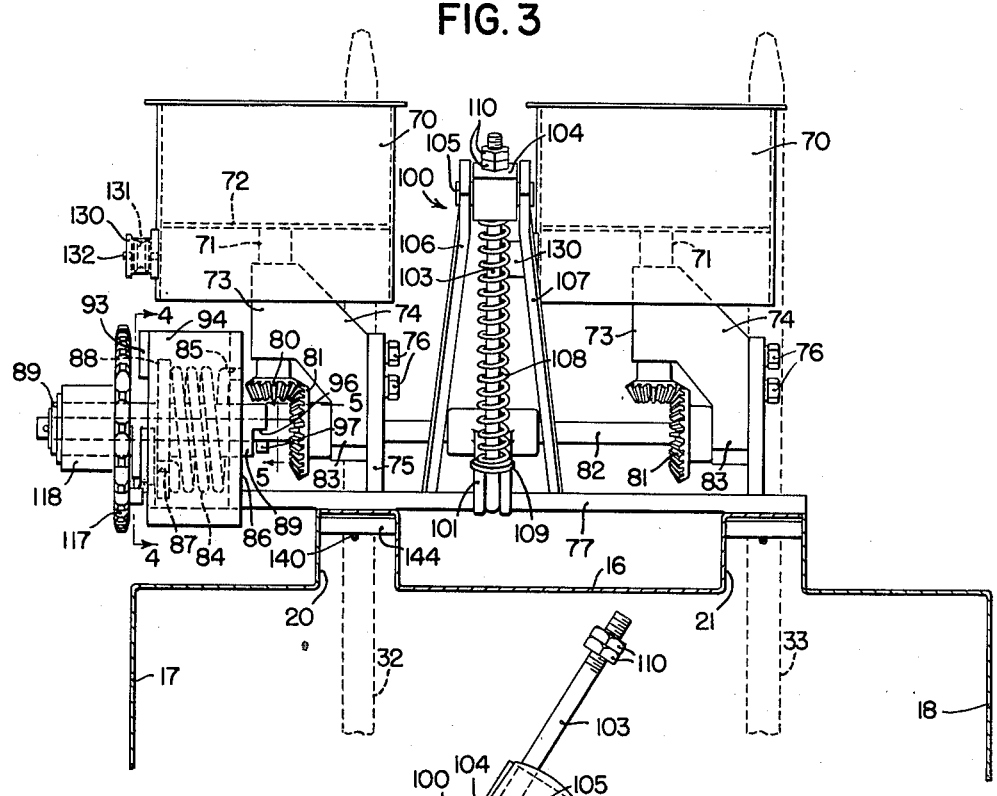
FIG. 3
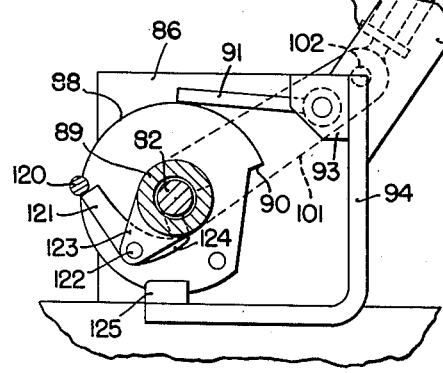
FIG. 9
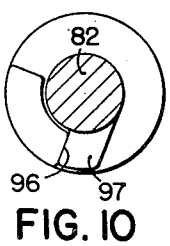
FIG. 10
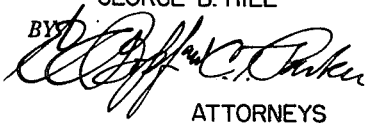
*INVENTOR.*
GEORGE B. HILL
BY
ATTORNEYS March 11, 1952  G. B. HILL  2,589,083
SLACK PULLER FOR BALE TIERS
Filed May 15, 1947  5 Sheets-Sheet 4
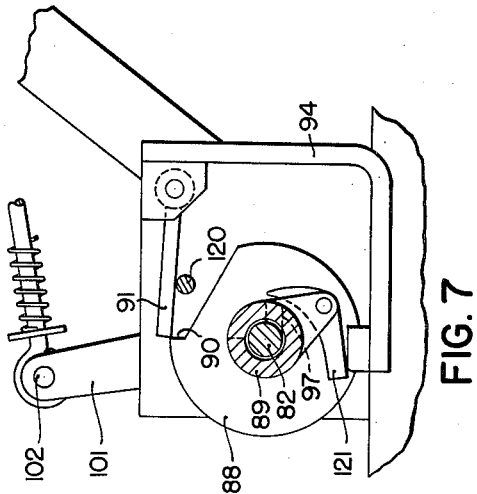
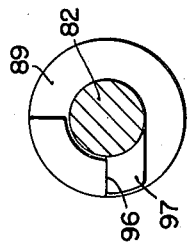
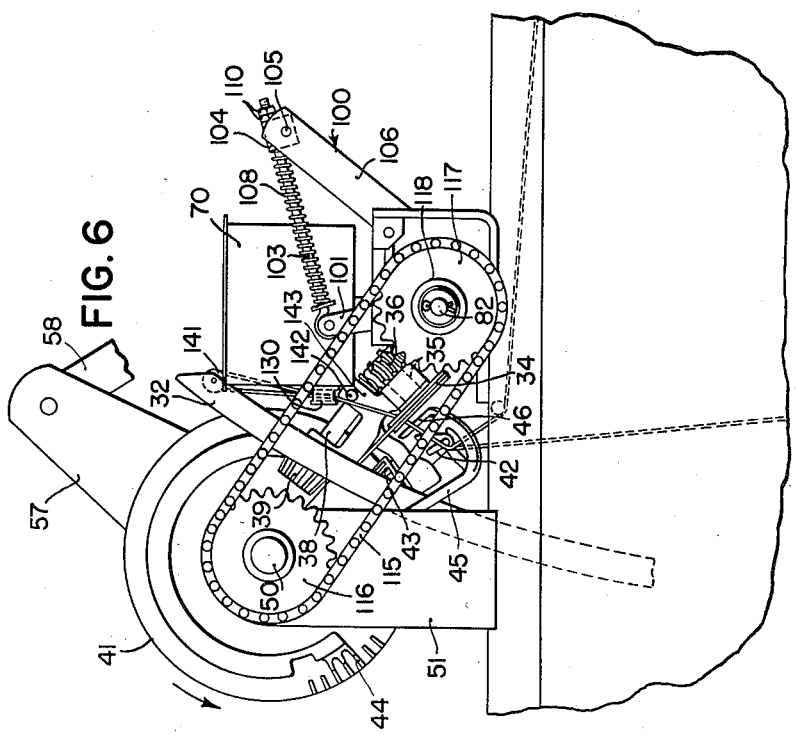
INVENTOR
GEORGE B. HILL
BY
ATTORNEYS March 11, 1952 G. B. HILL 2,589,083
SLACK PULLER FOR BALE TIERS
Filed May 15, 1947 5 Sheets-Sheet 5
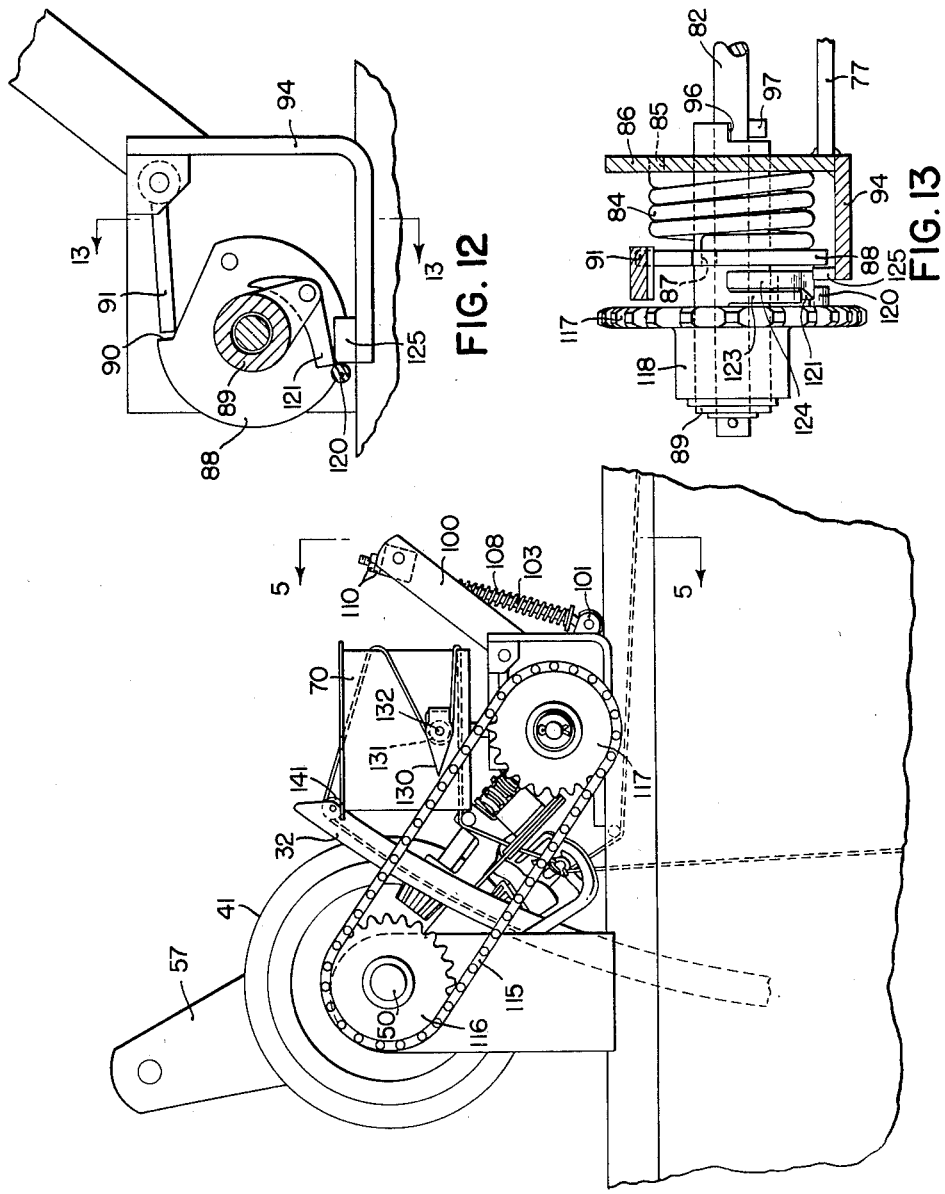
INVENTOR
GEORGE B. HILL
BY
ATTORNEYS Patented Mar. 11, 1952

2,589,083

UNITED STATES PATENT OFFICE 2,589,083

SLACK PULLER FOR BALE TIERS

George B. Hill, Ottumwa, Iowa, assignor to Deere Manufacturing Co., a corporation of Iowa Application May 15, 1947, Serial No. 748,228

19 Claims. (Cl. 100—20)

The present invention relates generally to automatic bale tying mechanism and is in the nature of an improvement over the mechanism of the type that comprises a bale case in which the harvested crops or other material to be baled is compressed, after which the bale is tied by means of tying mechanism including a needle which is mounted on the bale case and is adapted to be shifted through the latter to carry a tying strand, preferably twine although wire or any other conventional strand may be used, across the end of the newly formed bale to the tying or knotting mechanism mounted on the opposite side of the bale case. The tying mechanism is provided with means for holding the end of the twine, which is then tied by the knotting mechanism to the portion of the strand which is brought across by the needle. The twine is then cut adjacent the knot and the holding device holds the new end of the twine as the needle is retracted from the bale case, pulling the twine from the ball or supply, to stretch the same across the bale case in order to start the succeeding bale. As the succeeding bale is formed by pressing charges of hay against the twine and pushing the compressed material along the bale case, it is obvious that considerable strain will be imposed upon the twine due to the fact that it must be pulled from the ball around the two corners at the forward end of the bale. Under certain conditions, difficulty has been encountered because of the breaking of the twine caused by the excessive tension necessary to pull the strands around the end of the bale during formation of the latter.

It is, therefore, one of the principal objects of the present invention, to provide a novel and improved means for pulling a substantial length of twine across the bale case before the bale is formed, which length of twine can later be fed into the bale case as the bale is formed, to lie along the adjacent side of the bale and thus eliminate the necessity for pulling the twine around the end of the bale. Thus, it will be evident that the portion of the strand across the front end of the bale being formed does not slide across the end of the bale in either direction but remains stationary, while the twine necessary for the two long sides of the bale is fed from the twine supply at one side and from the slack which was pulled through the bale case before the new bale was started.

Another object relates to the provision of spring means for actuating the slack pulling device in order to obtain a quickly operating mechanism which is accurate in measuring the amount of slack pulled from the ball.

Still another object relates to the provision of power operated means for automatically restressing the spring actuating mechanism.

A further object relates to the provision of an adjustable limit mechanism for adjusting the amount of slack to compensate for different lengths of bales.

A still further object relates to the provision of spring mechanism for holding the slack away from the bale, the mechanism being yieldable to permit the slack to be fed automatically to the bale as the latter accumulates in size.

These and other objects and advantages of my invention will be apparent to those skilled in the art after a consideration of the following description, in which reference is had to the drawings appended hereto, in which Figure 1 is a top plan view of a portion of a bale case showing the tying mechanism and the mechanism embodying the principles of the present invention for the purpose of pulling slack twine from the twine supply;

Figure 3 is a sectional elevational view, on an enlarged scale, taken along the line 3—3 in Figure 2 and showing the slack pulling mechanism;

Figure 6 is a side elevational view, drawn to an enlarged scale, showing the mechanism in the positions in which the parts appear during a step in the tying operation, just before the slack pulling device has started its actuation;

Figure 7 is a view similar to Figure 4 but showing the parts in positions corresponding to those in Figure 6;

Figure 8 is a sectional view similar to Figure 5 but showing the parts in positions corresponding to the conditions of Figures 6 and 7;

Figure 9 is a view somewhat similar to Figures 4 and 7 but further including the overcenter spring device and showing the parts in a transitory position during the actuation of the slack pulling device;

Figure 10 is a view similar to Figures 5 and 8 but showing the parts as they appear during the transitory position illustrated in Figure 9;

Figure 11 is an elevational view similar to Figures 2 and 6 showing the positions of the parts at the end of the slack pulling operation;

Figure 12 is a view similar to Figures 4, 7 and 9 showing the parts as they appear substantially at the end of the slack pulling operation; and Figure 13 is a sectional elevational view taken along the line 13—13 in Figure 12.

Figure 1:
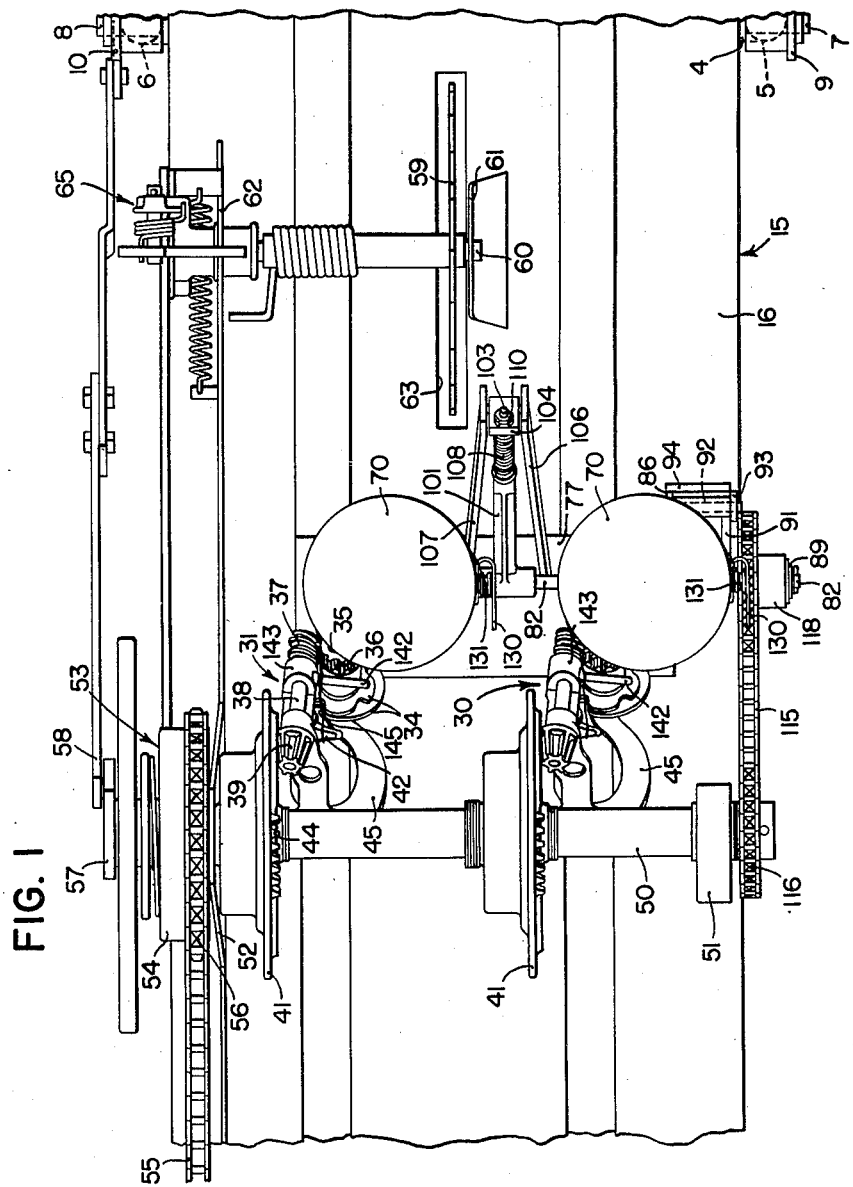

Referring now to the drawings, and more particularly to Figures 1-5, inclusive, the bale case is indicated in its entirety by reference numeral 15 and comprises a rectangular sheet metal case including a top wall 16, front and rear side walls 17, 18 and a bottom wall 19. The top and bottom walls 16, 19 are each formed to provide a pair of laterally spaced longitudinally extending passages or channels 20, 21 to accommodate the twine encircling the bales, as is well known to those skilled in the art.

The bale case 15 is provided with a feed opening 22 in the front wall 17, through which the hay, straw, or other material is fed by means of any suitable feeding mechanism (not shown).

The harvested crops are compressed in the bale case 15 by means of a reciprocating plunger head 25 which is driven by a pitman 26 pivotally connected thereto at 27. The plunger head 25 is shiftable across the fed opening 22 toward the right, as viewed in Figure 2, the working face 28 of the plunger head engaging the crops which have been fed through the opening 22 and forcing them into the bale being formed, after which the plunger head 25 is withdrawn toward the left to permit a new charge of hay to be fed into the opening 22, in a manner well known to those skilled in the art.

The mechanism for tying the bales is disposed on top of the bale case 15 and comprises a pair of transversely spaced knotting mechanisms 30, 31 and a pair of transversely spaced needles 32, 33 associated therewith, respectively, the positions of which are indicated in dotted lines in Figure 3 as the needles appear when they are raised in tying position. The needles 32, 33 are mounted on a U-shaped bail 4 which extends transversely beneath the bale case and has a pair of upwardly extending supporting arms 5, 6 pivotally mounted by means of coaxial pins 7, 8 on brackets 9, 10, which are fixed to the front and rear side walls 17, 18, respectively, of the bale case 15.

Each of the knotters 30, 31 is of conventional construction. Briefly, each knotter includes a twine holder 34 comprising notched disks adapted to clamp therebetween the end of the twine during the formation of the blade and also to receive the other end of the twine to hold the two ends together while the knot is being tied. The disks are mounted on a shaft 35 which is driven by a worm gear 36 in mesh with a worm 37 on a shaft 38 which receives power from a bevel gear 39 which is adapted to mesh with a gear segment 40 on a knotter wheel 41. The knotter also includes a knotter hook 42 which is rotated by a bevel gear 43 adapted to mesh with a gear segment 44 on the knotter wheel 41. A knife arm 45 is swingable under the knotter hook 42 and carries a knife blade 46 cooperable with the twine holder disk 34 to sever the twine after the knot is tied and to slip the knot off the hook 42, in a manner well known to those skilled in the art.

The knotter wheels 41 are fixed to a transverse drive shaft 50, which is rotatably supported in a bearing pedestal 51 at one end and in a vertical plate 52 near the opposite end. Power is obtained for driving the shaft 50 to actuate the knotters 30, 31, from a self-interrupting single revolution clutch mechanism 53 having a continuously rotating element 54 driven by a power transmitting chain 55 trained over a sprocket 56 on the element 54. The chain 55 is driven by a second sprocket (not shown) connected with the crank shaft which drives the pitman 26 of the plunger head 25, thus synchronizing the movement of the plunger head with the rotation of the drive shaft 50.

The shaft 50 also drives the needles 32, 33 upwardly through the bale case 15 through an arm 57 mounted on the shaft 50 and a link 58 connected between the arm 57 and the arm 6 of the bail 4, which supports the needles.

The clutch mechanism 53 is controlled by a measuring wheel 59 mounted on a rotary shaft 60 which is journaled in a pair of supporting brackets 61, 62 on top of the bale case. The wheel 59 is serrated around its periphery and extends through a slot 63 in the top wall 16 of the blade case into engagement with the baled crops within the bale case. During the formation of a bale, the latter moves slowly toward the right, as viewed in Figure 2, as it accumulates in size, turning the measuring wheel 59; and when the latter is turned through one revolution it actuates the self-interrupting clutch 53 through suitable tripping mechanism indicated generally by reference numeral 65. This causes the clutch 53 to connect the shaft 50 to the continuously rotating element 54 to be rotated through a single revolution, thereby swinging the needles upwardly through the bale case and actuating the tying mechanism to tie the twine around the bale which has just been formed. The needles 32, 33 pass upwardly through a pair of vertically extending slots 66 in the working face 28 of the plunger 25.

The details of construction of the clutch mechanism 53, the tripping mechanism 65, and the connection between the shaft 50 and the needle supporting bail 4 do not form a part of the present invention and may be of any suitable design.

Coming to that part of the structure with which my invention is more directly concerned, each of the knotting devices 30, 31 is provided with a slack pulling device in the form of a drum 70, and since the two slack pulling devices are substantially identical, it is considered that a detailed description of one will suffice for both. The drum 70 is disposed on a substantially verticall axis and is mounted on a vertical shaft 71 which is disposed coaxially within the drum and is attached to a radially extending spider 72 within the drum. The shaft 71 is supported in a vertical bearing bracket 73 mounted on an arm 74 which is secured to a vertical bracket 75 by means of suitable bolts 76. The bracket 75 is mounted on a generally horizontal base plate 77 which is fixed to the upwardly extending channels or ridges 20, 21 in the top wall 16 of the bale case. The lower end of the shaft 71 is provided with a bevel gear 80 in mesh with a bevel gear 81 fixed to a generally transversely disposed drive shaft 82, which is rotatably supported in bearing brackets 83 in the lower portions of the drum supporting arms 74. The bevel gear 81 is appreciably larger in diameter than the gear 80, on the order of two to one, whereby an angular movement of the shaft 82 about its axis will produce an appreciably larger displacement of the drum 70 about its axis of rotation.

The shaft 82 is driven by means of a helical spring 84 encircling the shaft 82 and substantially coaxial therewith. One end of the spring 84 is anchored at 85, Figure 3, to a vertical plate 86 rigidly fixed to the supporting plate 77, and the opposite end of the spring 84 is fixed at 87 to a disk 88, which is rigidly fixed to a hub or sleeve 89, which is rotatable on the shaft 82. The periphery of the disk 88 is notched to provide a radially extending shoulder 90, which is adapted to be engaged by a latch dog 91 pivotally mounted on a transversely extending pivot pin 92 supported in a pair of ears 93, which are fixed to a vertical bracket 94 formed integrally with the base plate 77. The spring 84 is wound by turning it in a counterclockwise direction, as viewed in Figure 4, until the latch 91 engages the shoulder 90 on the disk 88, thereby holding the spring in stressed condition.

The inner end of the sleeve 89 is notched to provide an axially extending shoulder 96, which is adapted to engage a radially extending lug 97 fixed to the shaft 82 for transmitting a force to the latter to rotate the shaft 82 in a clockwise direction by the stored energy in the spring 84 when the latch 91 is released. This is a lost motion connection, however, and transmits force in only one direction, for when the spring is rewound, the shoulder 96 is rotated away from the lug 97 and thus no opposite rotation is imparted to the shaft 82 by rewinding the spring.

The position of the shaft 82 and drums 70 is also controlled by an overcenter spring device, indicated generally by reference numeral 100, which has an arm 101 rigidly attached to the shaft 82 and having a bifurcated outer end pivotally connected at 102 to an eyebolt 103. The eyebolt 103 extends outwardly through a collar 104 which is pivotally connected by a pin 105 to a pair of rigid bracket arms 106, 107 rigidly attached to the base plae 77. A helical spring 108 encircles the eyebolt 103 and bears against a collar 109 at the head of the bolt and reacts against the collar 104. A pair of lock nuts 110 is threaded on the outer end of the eyebolt 103 and serves as a limit stop to restrain the spring 108 in the extreme positions of the arm 101.

Figures 2, 4, 5:
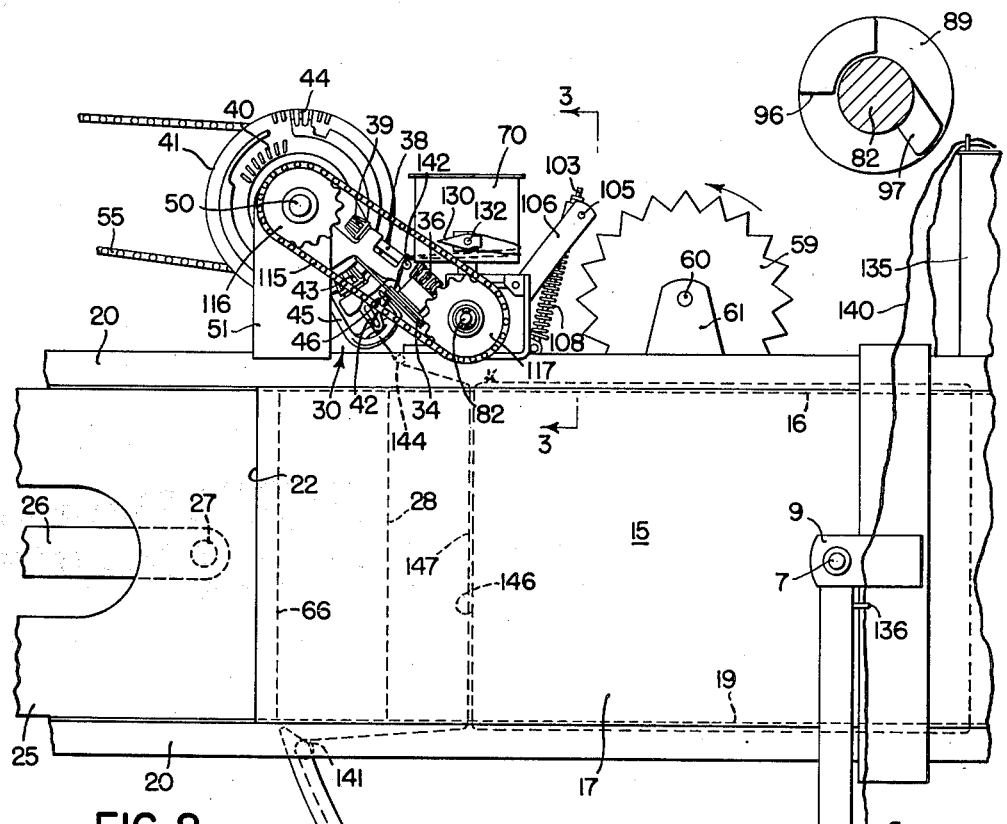
Figure 2 is a side elevational view of the bale case and shows the mechanism as it appears during the beginning of a new bale.
Figure 4 is a sectional view taken along the line 4—4 in Figure 3.
Figure 5 is a sectional view taken along the line 5—5 in Figure 3 and drawn to an enlarged scale.

Thus, the eyebolt 103 and the arm 101, being pivoted together by the pin 102, form a pair of toggle links which cause the spring 108 to be compressed when the links are in a substantially aligned position approximately as illustrated in Figure 9, which shows the links and spring in a near dead-center position. Thus, the compression force of the spring 108 can be utilized to force the arm 101 in either direction from the dead-center position, the two extreme positions being illustrated in Figures 4 and 7. When the arm 101 is in the position shown in Figures 3 and 4 the lower of the lock nuts 110 engages the collar 104 to limit the extent of movement of the arm in this direction. In this position of the arm 101 and shaft 82, the lug 97 is separated angularly from the shoulder 96 on the sleeve 89 when the drive spring 84 is wound and latched, as indicated in Figure 5. When the arm 101 is in the other extreme position, as indicated in Figures 6 and 7, the lug 97 is preferably in contact with the shoulder 96, as indicated in Figure 8. However, this depends on the position of the lock nuts 110 on the end of the eyebolt 103 and may limit the movement of the arm 101 so that the lug 97 does not quite swing into contact with the shoulder 96.

The drive spring 84 is wound by power received from the knotter drive shaft 50 through a drive chain 115 trained over a sprocket 116 fixed to the drive shaft 50 and a second sprocket 117 having a hub 118 which is journaled on the outer end of the sleeve 89. A pin 120 is fixed to the inner face of the sprocket 117 and extends axially inwardly therefrom and is engageable with the latch 91 (Figure 7) as the sprockets 116 and 117 turn in a counterclockwise direction, as viewed in Figure 4. Thus, it is evident that the pin 120 will be moved upwardly into engagement with the bottom of the latch 91 to release the latter from the shoulder 90 on the disk 88 to permit the spring 84 to drive the shaft 82 in a clockwise direction, as viewed in Figure 4.

A pawl 121 is pivotally mounted by means of a pin 122 on a radially extending arm 123 formed integrally with the sleeve 89. Rotary movement of the sleeve 89 and arm 123 throws the pawl 121 outwardly by centrifugal force as it travels upwardly in a clockwise direction, as viewed in Figure 4. The pawl is provided with an oppositely extending arm 124 which bears against the sleeve 89 to limit the outward movement of the pawl 121. Thus it will be evident that after the latch 91 has been released by the pin 120, the sleeve 89 and arm 123 rotate in a clockwise direction to drive the shaft 82 by energy previously stored in the spring 84, while the sprocket 117 and pin 120 are traveling in a counterclockwise direction. The pin is adapted to engage the end of the pawl 121 as the two come together in a position substantially as indicated in Figure 9, whereupon further movement of the sprocket 117 and pin 120 arrests further rotation of the spring 84 and sleeve 89 and returns the latter to its original position, thereby rewinding the spring.

As best shown in Figures 12 and 13, the pawl 121 is disengaged from the pin 120 by means of a block 125 mounted on the bracket 94 and engageable with the back of the pawl as the latter passes over the block 125. The pin 120, however, passes alongside the block 125, whereupon the pawl 121 is released from the pin, but, inasmuch as the latch 91 has just dropped over the shoulder 90, the latch engages the shoulder to prevent the spring from driving the sleeve 89 after the pawl 121 has been disengaged from the pin 120.

Each of the drums 70 is provided with a hook 130, which is mounted on the periphery of the drum and which is U-shaped to support a sheave 131 journaled on a pin 132 supported between the sides of the U-shaped hook. When the spring 84 is released to drive the shaft 82, the drums are driven through the bevel gears 80, 81 in a clockwise direction, as viewed from above, thereby swinging the hook 130 from a position (indicated in Figure 6) approximately three-quarters of a revolution to the position indicated in Figure 11, during which movement the hook 130 engages the twine which has been brought up alongside the drum by the needle 32.

The operation of the bale tying mechanism is as follows:

At the beginning of the formation of a new bale, the twine extends from the ball of twine contained in a container 135 and extends downwardly alongside the bale case through a pair of guides 136, 137 on the bail arm 5 and over a sheave 138 journaled on a pin 139 within the hollow needle 32. The twine is indicated by reference numeral 140 and extends through the needle and over a small roller or sheave 141 near the point of the needle, from which it extends upwardly through the bale case 15 and over a short transversely extending cylindrical rod 142 formed as a part of the bracket 143 on which the knotting mechanism is supported. The twine 140 is then trained around the drum 70 and over the sheave 131, returning around the circumference of the drum and back over the rod 142 and terminates at the twine holder 34, which firmly grips the end of the twine.

As the plunger 25 compresses successive charges of harvested crops against the resistance offered by the previously tied bale 146, the vertically extending portion 147 of the strand of twine 140 is pushed toward the right, as viewed in Figure 2, pulling twine from the supply ball along the bottom of the bale case within the channel 20 and over the sheave 141 at the end of the needle. The twine along the top of the bale being formed is pulled under a rod 144 in the channel 20 in the top of the bale case, and down over the upper rod 142, thereby rotating the drum 70 by pulling against the sheave 131. This causes the shaft 82 to be rotated, thereby swinging the arm 101 upwardly and compressing the spring 108 as slack is pulled from the drum 70. The pressure of the spring 108 maintains the twine fairly tight along the top of the bale, thereby preventing the twine from becoming caught on any projecting parts of the knotter mechanism. As the bale further accumulates in size, the arm 101 and eyebolt 103 pass over the dead-center position in which the two are in alignment and the spring 108 is compressed to maximum degree, after which the pressure of the spring acts against the arm 101 to swing the latter quickly around to the position illustrated in Figure 7. This causes the hook 130 to be pulled out of the loop of twine on the drum 70, thereby releasing the slack to be taken up by further accumulation of the bale. During this first part of the formation of the bale, the lug 97 on the shaft 82 has been moving slowly angularly from the position shown in Figure 5, and at the time the arm 101 and eyebolt 103 pass through the dead-center relation the lug 97 is substantially in the position shown in Figure 10, and is finally swung by the action of the spring 108 into engagement with the shoulder 96, coming to rest in the position illustrated in Figure 8, the shoulder 96 being stationary during this entire period by virtue of the fact that the sleeve 89 is held stationary by the latch 91, which engages the shoulder 90 on the disk 88.

Eventually, the bale reaches its completed size, at which time the upper length of twine is stretched along the top of the bale and is still held firmly by the twin holder disks 34.

The measuring wheel 59 has by this time rotated through a complete revolution and actuates the tripping mechanism 65 to engage the clutch mechanism 53, thereby connecting the continuously rotating element 54 to the shaft 50 to turn the latter through a single complete revolution.

During the first portion of this revolution of the shaft 50 the arm 57 acts through the link 58 to raise the needle upwardly through the bale case into the position illustrated in Figure 6, in which the needle projects appreciably beyond the top wall 16 of the bale case and stretches the twine upwardly along the completed end of the newly formed bale, thereby laying the strand into the notch 145 (Figure 1) in the twine holder 34. The rotating knotter wheel 41 then engages the bevel gear segment 40 with the bevel gear 39 and turns the twine holder disks 34 to clamp to strand tightly therebetween, and then the gear segment 44 engages the bevel gear 43 to cause the knotter hook to begin rotation to tie the knot.

During this first portion of the revolution of the drive shaft 50, the sprocket 117 has been rotated to bring the pin 120 into engagement with the latch 91, forcing it upwardly out of engagement with the shoulder 90 on the disk 88 (see Figure 7). The helical spring 84 is immediately released to rotate the sleeve 89 and disk 88 in a clockwise direction, as viewed in Figure 7, and inasmuch as the spring 84 is more powerful than the compression spring 108, the arm 101 is rotated with the shaft 82 in a clockwise direction, as viewed in Figure 7. The force of the spring 84 is transmitted through the shoulder 96 and lug 97 to the shaft 82 to effect this angular movement, thereby compressing the spring 108 and moving the arm 101 and eyebolt 103 through the overcenter position of Figure 9. The shoulder 96 and lug 97 are now in the position illustrated in Figure 10. This has caused the drum 70 to be rotated in a clockwise direction, as viewed from above, hooking the hook 130 behind the twine between the twine holder 34 and the sheave 141 in the upper end of the needle, thus pulling some slack from the ball of twine in the container 135 up through the hollow needle over the rod 142.

At about this time, the pin 120 on the sprocket 117, which is rotating in a counterclockwise direction, engages the end of the pawl 121 which is being carried in the opposite direction of rotation by the rotating sleeve 89 under power from the spring 84, and further rotation of the sprocket 117 causes the pin 120 to force the pawl 121, together with the arm 123 and sleeve 89 in a counterclockwise direction, as viewed in Figure 9, until the latch dog 91 drops over the end of the shoulder 90, as illustrated in Figure 12, at which time the pawl 121 engages the block 125 and is lifted out of engagement with the pin 120, which passes under the pawl 121 alongside the block 125 and comes to rest at the end of its complete revolution, in the position shown in Figure 4. The latch 91 engages the shoulder 90 to prevent further movement of the disk 88 and sleeve 89 and holds the spring 84 in rewound condition.

As the arm 101 and eyebolt 103 pass through overcenter position, the compression spring 108 continues to swing the arm 101 in a clockwise direction, as viewed in Figure 9, until the lower of the lock nuts 110 engages the top of the collar 104 thereby stopping the movement of the arm 101, shaft 82, and drum 70 in the positions shown in Figure 11. At the time the pin 120 reverses the direction of movement of the sleeve 89 by engaging the end of the pawl 121, the shoulder 96 also reverses its direction of movement and moves away from the lug 97 which continues to rotate in a counterclockwise direction, as viewed in Figure 10, whereby at the end of the cycle, the shoulder 96 and lug 97 have been returned to the positions indicated in Figure 5.

During the last portion of the revolution of the drive shaft 50, the loop of twine is pushed off the knotter hook 42 by the knife arm 45 while the knife 46 severs the twine from the twine holder 34. The knife arm 45 is actuated by camming mechanism (not shown) but which is well known to those skilled in the art. As the needle 32 is withdrawn downwardly through the bale case, twine is fed from the twine supply through the hollow needle to form the vertical length 147 within the bale case against which the new bale is compressed.

It is now evident that the slack pulling drum 70 provides a length of twine which may be pulled along the top of the bale through the upper channel or groove 20 during the formation of the bale, thus obviating the necessity for pulling from the supply ball all of the twine needed to pass along the bottom, around the two corners and along the top of the bale being formed, which requires sufficient tensional force to break the twine under certain crop conditions. Inasmuch as there is, according to the present invention, no vertical movement of the twine across the front end of the bale being formed, there is very little tension in the twine during the formation of the bale beyond that required to maintain the twine snugly against the bale.

It will be noted that the lock nuts 110 can be adjusted axially of the eyebolt 103 to adjust the amount of slack taken up by the drum 70 to the proper amount required for the length of bale being formed. In case it is desired to change the length of the bales being formed, for example, to make them longer, a measuring wheel 59 of slightly greater circumference is used and the nuts 110 are adjusted outwardly on the eyebolt 103 to provide for taking up somewhat greater length of slack on the drum 70.

Although I have described the action of only one of the knotting mechanisms and slack pulling devices, it will be understood that the mechanism shown herein is adapted to tie two strands of twine from two supply balls in laterally spaced arrangement on the bale. The action of the two twine tying mechanism is, of course, simultaneous, since both are driven from the same shaft 50.

I claim:

1. In a baler, a slack pulling device, an actuating shaft therefor, an arm fixed on said shaft, a compression spring bearing against said arm, a support for said spring against which the latter reacts, said spring being swingable with said arm through a dead-center position for urging said arm in relatively opposite directions on opposite sides of said dead-center position, respectively, a second spring for driving said shaft, means for stressing said second spring, latch means for holding said second spring in stressed condition, and means for releasing said latch, said second spring being adapted to drive said shaft to shift said arm pulling device from one end of its range of movement through said dead-center position of said compression spring and against the pressure of the latter.

2. In a baler, a slack pulling device comprising a rotatable drum and a strand engageable member thereon, a drive shaft for rotating said drum, a helical spring disposed coaxially of said shaft for driving the latter, power actuated means for winding said spring, releasable means for holding said spring in wound condition, and timing means for actuating said releasable means at the proper time in the bale tying operation to cause said spring to drive said shaft and said slack pulling device.

3. In a baler, a slack pulling device, an actuating shaft therefor, spring means for driving said shaft, latch means for holding said spring means in stressed condition, a driven member adapted to rotate through a predetermined range during a bale tying operation and having a part engageable with said latch means to release the latter to cause movement of said shaft and said device, means for restressing said spring comprising a pair of interengageable elements on said driven member and said spring means, respectively, said elements being adapted to interengage to return said spring means to stressed condition during further movement of said driven member in said range, and means providing a lost motion connection between said spring means and said slack pulling device whereby restressing of said spring means is effected without returning said device.

4. In a baler, a slack pulling device, an actuating shaft therefor, spring means for driving said shaft in one direction, a connection between said driving spring means and said shaft operable to transmit force in said one direction only, releasable means for holding said spring means in stressed condition, a driven member adapted to rotate through a single revolution in the opposite direction during a bale tying operation and having a part engageable with said releasable means during said revolution to release the latter to initiate movement of said shaft and device by power from said spring, a pair of elements on said spring means and said driven member interengageable during rotary movement in relatively opposite directions, whereby said driven member restresses said spring means during the remainder of said revolution of movement and re-engages said releasable means, and means for urging said shaft and said slack pulling device in said one direction of movement.

5. The combination set forth in claim 4, including the further provision that one of said elements is retractable and means engageable with said retractable element at the end of said revolution to disengage said elements.

6. The combination set forth in claim 4, including the further provision that said means for urging said shaft and said device comprises an over-center reversible spring device adapted to resist the initial movement of said shaft but reversible before said elements interengage to restress said spring means.

7. The combination set forth in claim 4, including the further provision of adjustable stop means for limiting the movement of said shaft and device to control the amount of slack pulled out by said device to accommodate various lengths of bales.

8. The combination set forth in claim 4, including the further provision that said means for urging said shaft and said device comprises an arm fixed on said shaft, a spring influencing said arm, and a support for said arm-influencing spring against which the latter reacts, said arm-influencing spring being swingable with said arm through a dead-center position for urging said arm in relatively opposite directions on opposite sides of said dead-center position, respectively, said elements being adapted to interengage after said arm-influencing spring has passed over dead-center, whereby said arm-influencing spring carries said device to the limit of its range while said driving spring means is being restressed.

9. The combination set forth in claim 4, including the further provision that said means for urging said shaft and said device comprises an arm fixed on said shaft, a spring influencing said arm, a support for said arm-influencing spring against which the latter reacts, said arm-influencing spring being swingable with said arm through a dead-center position for urging said arm in relatively opposite directions on opposite sides of said dead-center position, respectively, said elements being adapted to interengage after said compression spring has passed over dead-center, whereby said arm-nifluencing spring carries said device to the limit of its range while said driving spring means is being restressed, and an adjustable stop for determining the extent of movement of said shaft and device by force exerted by said arm-influencing spring, to control the amount of slack in the strand pulled out by said device to accommodate various lengths of bales.

10. In a baler having supporting structure including a bale case: tying mechanism on one side of said case, means movable crosswise of the case for passing a strand toward said tying mechanism, said tying mechanism having means for receiving and holding the end of said strand, actuating means for moving the strand-passing means, means on the supporting structure engageable with said strand and movable to pull out some slack in the strand to be used during the formation of a succeeding bale, energizable spring means for moving said slack-pulling means, means for energizing the spring means, releasable means for holding said spring means in energized condition, means operative in response to a condition including movement of the strand-passing means in one phase by the actuating means for releasing said releasing means, and means operative in response to a condition including movement of said strand-passing means by the actuating means for incurring operation of the energizing means to restore energy to said spring means.

11. In a baler having supporting structure including a bale case in which bales are successively formed and wherein the bales are separately tied by one or more tying strands fed from a source of supply: means for holding the end of a tying strand at one side of the bale case during formation of a bale, means at another side of the bale case for passing the strand in the form of a loop transversely through said case into engagement with said holding means after completion of a bale for tying one portion of said loop to said held end, means on the supporting structure engageable with another portion of said loop and operative to pull slack from the source of supply to provide the necessary length of strand to lie along the adjacent side of a succeeding bale, actuating means for moving said strand-passing means, energizable spring means for moving said slack-pulling means, releasable means for holding said spring means in energized condition, means operative in response to a condition including movement of the strand-passing means by the actuating means for releasing said releasable means, and means driven by said actuating means for energizing said spring means.

12. In a baler having supporting structure including a bale case in which bales are succesively formed and wherein the bales are separately tied by one or more strands fed from a source of supply: means for holding the end of said strand at one side of the bale case during formation of a bale, a needle along which said strand extends to the source of supply, means mounting said needle and providing for shifting of said needle transversely through said case to carry a loop of said strand into a tying position adjacent said held end after completion of a bale, means for tying one portion of said loop to said held end, movable means adjacent said tying means and engageable with another portion of said loop to pull slack from the source of supply to provide the necessary length of strand to lie along the adjacent side of a succeeding bale, actuating means for moving said needle into and out of tying position, energizable spring means for moving said slack-pulling means to pull slack through said needle, releasable means for holding said spring means in energized condition, means responsive to movement of said needle-actuating means for releasing said releasable means to initiate movement of said slack-pulling means, and means driven by said needle-actuating means for returning said spring means to energized condition, there being a disengageable connection between said spring means and said slack-pulling means providing for energizing of said spring means without releasing slack from said slack-pulling means.

13. The combination set forth in claim 12, including the further provision that said slack pulling means comprises a rotatable drum mounted on said bale case and having a strand-engageable finger thereon.

14. In a baler including a bale case, tying mechanism on one side of said case, movable means for passing a strand transversely through said case toward said tying mechanism, said tying mechanism having means for holding the end of said strand, means for actuating the strand-passing means, means adjacent said tying mechanism engagable with said strand and movable to pull out some slack in the latter to be used during the formation of the succeeding bale, said slack-pulling means comprising a rotatable drum mounted on said bale case adjacent said holding means, energizable spring means for rotating said drum, releasable means for holding said spring means in energized condition, and means operative in response to a condition including movement of said strand-passing means by said actuating means for disabling said releasable means.

15. In a baler including a bale case, tying mechanism on one side of said case and means for passing a strand transversely through said case toward said tying mechanism, said tying mechanism having means for holding the end of said strand, means adjacent said tying mechanism engageable with said strand and movable to pull out some slack in the latter to be used during the formation of the succeeding bale, said slack-pulling means comprising a rotatable drum mounted on said bale case adjacent said holding means, a helical spring for rotating the drum, a latch for holding said spring and drum against rotation, and means for driving said needle and having a part engageable with said latch for releasing the latter to initiate movement of said drum.

16. In a baler having tying mechanism and a source of tying medium usable in the tying mechanism for tying bales: a device connectible to the tying medium for pulling slack in said medium incident to the tying of bales, said device being shiftable through a predetermined range, over-center spring means operative to urge the device toward one limit or the other of its range, which ever is nearer, and means operative incident to operation of the tying mechanism for shifting the device from one limit of its range and against the action of said spring means through the intermediate portion of its range and into that portion of said range in which said spring means urges the device to the other limit of said range.

17. In a baler having tying mechanism and a source of tying medium usable in the tying mechanism for tying bales: a device connectible to the tying medium for pulling slack in said medium incident to the tying of bales, an actuating shaft for the device, an arm fixed on and movable with said shaft through a predetermined range, a compression spring bearing against said arm, a support for said spring against which the later reacts, said spring being swingable with said arm through a dead-center position within said range for urging said arm in relatively opposite directions on opposite sides of said dead-center position, respectively, and power actuated means operative incident to operation of the tying mechanism for rotating said shaft to shift said slack-pulling device from one end of its range of movement through said dead-center position of said spring until the latter urges said arm toward the other end of its range of movement.

18. In a baler having bale-forming means, tying mechanism, a source of tying medium usable in the tying mechanism for tying bales, and drive means for the bale-forming means and tying mechanism, the improvement comprising: a slack-pulling device connectible with the tying medium for pulling slack in said medium incident to the tying of bales, an actuating shaft for the device, a spring connected to the shaft for driving the shaft, means connectible to the driving means for stressing the spring, releasable means for holding the spring in stressed condition, and means operative incident to further operation of the drive means for releasing the releasable means to cause the spring to drive the shaft and actuate said device.

19. In a baler having bale-forming means, tying mechanism, a source of tying medium usable in the tying mechanism for the tying of bales, and drive means for the bale-forming means and tying mechanism, the improvement comprising: a slack-pulling device engageable with the tying medium, an arm movable angularly about an axis, yielding means acting against the arm and movable with the arm through an intermediate position of the arm for influencing movement of the arm in relatively opposite directions on opposite sides of the intermediate position, respectively, and means operative incident to operation of the drive means for moving the arm to actuate the slack-pulling device by movement of the arm from one side of said intermediate position to said intermediate position until the yielding means urges the arm toward its other position at the opposite side of said intermediate position.

GEORGE B. HILL.

REFERENCES CITED

The following references are of record in the file of this patent:

UNITED STATES PATENTS

| Number | Name | Date |
|---|---|---|
| 688,040 | Twitchell | Dec. 3, 1901 |
| 1,257,474 | Freeman | Feb. 26, 1918 |
| 1,534,517 | Getchell | Apr. 21, 1925 |
| 1,540,247 | Bowman | June 2, 1925 |
| 2,405,688 | Crumb | Aug. 13, 1946 |